United States Patent [19]
Otten et al.

[11] 3,786,340
[45] Jan. 15, 1974

[54] MINIATURE OPTICALLY PUMPED MAGNETOMETER PROBE USING LIGHT PIPES TO TRANSMIT LIGHT TO THE PROBE

[75] Inventors: Ernst W. Otten; Werner D. Farr, both of Heidelberg, Germany

[73] Assignee: Bruker-Physik AG, Forchheim Germany

[22] Filed: July 13, 1971

[21] Appl. No.: 162,280

[30] Foreign Application Priority Data
July 14, 1970 Germany.................... P 20 34 797.1

[52] U.S. Cl........... 324/0.5 R, 324/0.5 E, 324/0.5 F
[51] Int. Cl............................................. G01r 33/08
[58] Field of Search...................... 324/0.5 E, 0.5 F, 324/0.5 R, 43 L; 250/227

[56] References Cited
UNITED STATES PATENTS
2,975,330  3/1961  Bloom et al. ..................... 324/0.5 F
3,315,160  4/1967  Goodman ......................... 324/73 R
3,629,697  12/1971  Bouchiat et al. ................. 324/0.5 R OTHER PUBLICATIONS
Donszelmann et al., A Rubidium Magnetometer etc., Applied Sci. Res., Vol. 18; Aug. 1967; pp. 61–67
Usher, M.; A Miniature Rubidium Magnetometer; Meas. and Inst. Rev.; July, 1968; pp. 509 & 534

Primary Examiner—R. J. Corcoran
Attorney—Craig, Antonelli & Hill

[57] ABSTRACT

A magnetometer provides a cell containing atomic vapor, a coil surrounding the cell and a photocell responsive to light penetrating the cell all disposed in a probe of small volume, whereas the light source, r.f. generator for energizing the coil and indicating device are disposed remote from said probe with said light source being connected to said probe with said light source being connected to said probe by a flexible light conductor.

5 Claims, 1 Drawing Figure

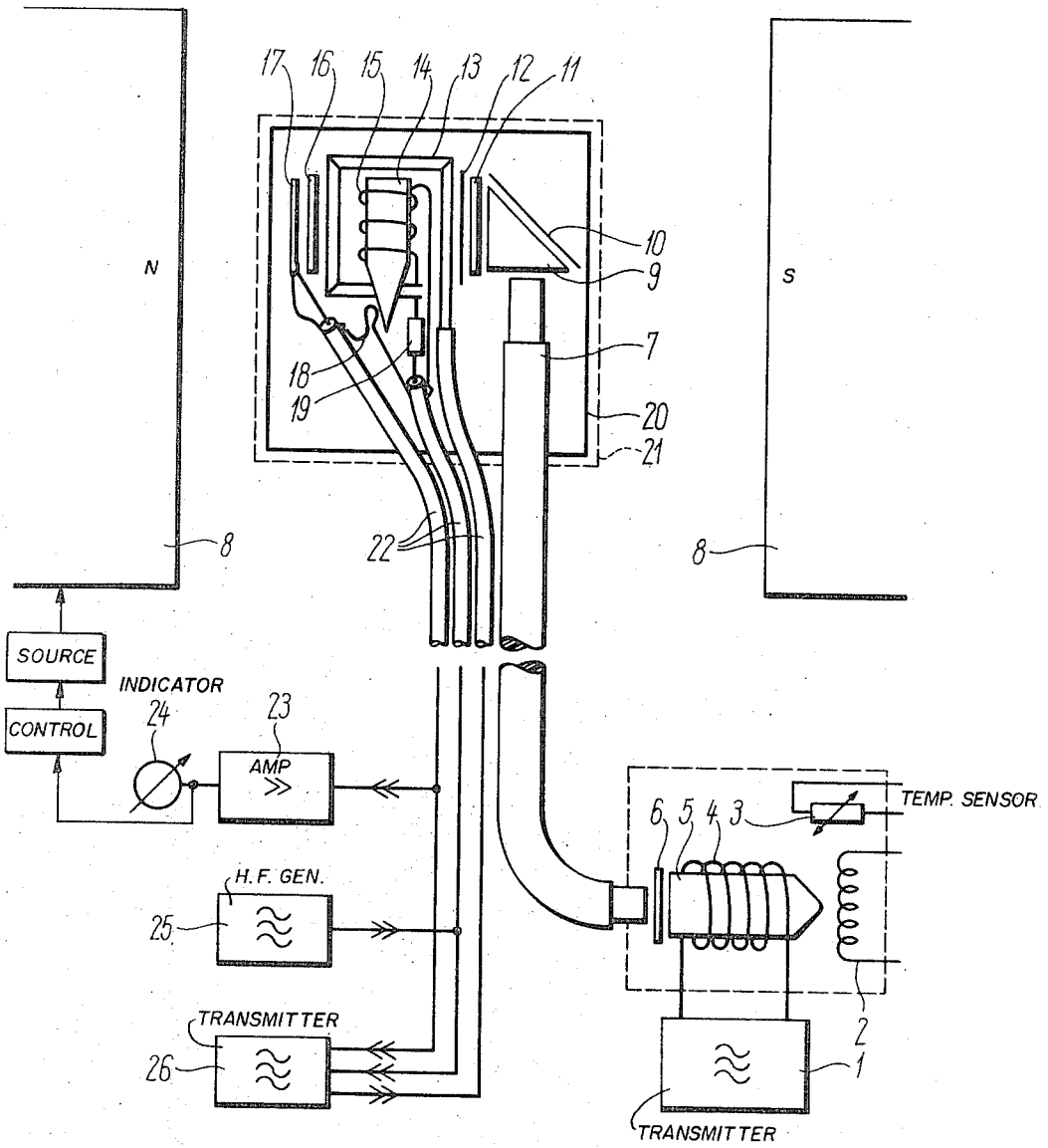

MINIATURE OPTICALLY PUMPED MAGNETOMETER PROBE USING LIGHT PIPES TO TRANSMIT LIGHT TO THE PROBE

The present invention relates to a magnetometer which combines high precision with a wide range of application. It is known that magnetic fields can be measured with high accuracy on the basis of optical pumping. By irradiation of polarized resonance light into atomic vapor preferably in the form of helium and alkaline metal vapors, the Zeeman levels of atomic conditions are differently populated. The extent of excitation is apparent from a variation of the transmissivity of the vapor, or a variation of the intensity of the light emitted from the vapor. By irradiating the magnetic field dependent Zeeman resonance frequencies this variation of the transmissivity is cancelled because of the uniform repopulation of Zeeman levels resulting therefrom. By measuring these resonance frequencies the magnetic field can be determined with high accuracy. Thus this method is similar to the known proton resonance. Its advantage, however, lies in the fact that it is a paramagnetic resonance the frequency of which is greater by the factor 100 with comparable line widths. Moreover the signal amplitude is independent from the magnitude of the magnetic field. For both reasons optical pumping is also particularly suited for high precision measurement of minor magnetic fields. The magnetometers known in the past based on the principle of optical pumping could not be used for laboratory purposes and general measurements. They have mainly been employed for the measurement of large magnetic fields such as the field of the earth. It is the chief object of the invention to eliminate the above disadvantages and to provide a magnetometer based on the principle of optical pumping permitting the measurement of magnetic fields within a limited space e.g. in coils or between magnetic pole shoes thus meeting the requirements of most laboratory and test applications. The solution presented by this invention consists in a probe of small volume comprising a prism, polarizer, cell, filter, photocell and heater mounted on a bracket and connected to a radiation source via a flexible light conductor. The active probe volume lies in the range of approximately 0.1 cm$^3$ so that relatively inhomogeneous magnetic fields can also be measured. For light transmission a flexible fibreglass conductor is used which can be installed in the same manner as a normal cable. The diameter of this fibreglass light conductor is approximately 5 mm corresponding to the cell diameter and its length approximately 3 meters. This new device covers a range from 1 Milligauss to more than 1 Kilogauss (tested up to 1.2 KG) and thus is much greater than that of the proton resonance (lower limit usually approx 1/100 Gauss). The measuring accuracy is 10 Microgauss and can be increased with the appropriate expenditure. A special embodiment of the present invention can also be employed for the control of magnetic fields. This control is achieved by feedback of the resonance signal to the power pack generating the magnetic field. Thus, the magnetic field is controlled automatically according to the given frequency. Feedback can be effected in known manner by electronic means.

Further applications of the present invention include the contact-free detection of electrical currents down to 100 Microampere for straight conductors (in the case of coils less according to the number of turns), the detection of smallest magnetic disturbances due to the material structure also in non-ferromagnetic materials such as high grade steel and the detection of iron parts in the ground etc. due to a disturbance of the earth magnetic field.

The present invention will be hereinafter more fully described with reference to the accompanying drawing which shows an embodiment by way of example.

The device according to the present invention comprises transmitter 1, heater 2, temperature sensor 3, coil 4, bulb 5 and interference filter 6. The radiation emitted by the radiation source thus formed by the above components is fed to the probe via the flexible light conductor. The probe is located in the magnetic field to be measured which for example can be generated by pole shoes 8 of a magnet. The probe includes prism 9 with aluminum foil 10 deflecting the beam by 90°. Moreover in the path of rays there is polarizer 11, a quarter wave plate 12 and cell 14 provided with coaxial heater 13. The cell contains vapor of the same chemical composition as the light source and has its inner walls coated with paraffin wax. Thus when a helium light source is used the cell will be filled with helium and in the case of a rubidium light source with rubidium vapor. Cell 14 is surrounded by high frequency coupling coil 15. The radiation from cell 14 enters photocell 17 through filter 16. The probe furthermore contains temperature sensor 18 and matching resistor 19. All components of the probe are contained in housing 20 with copper shielding 21. Three coaxial cables 22 provide the connection between amplifier 23, indicator 24 and high frequency generator 25 or heater power transmitter 26, respectively.

The function of the device according to the present invention is explained in the following assuming an Rb-probe.

The radiation emitted by the source, the wavelength of which is in the infrared range adjacent to the visible range is transmitted via flexible light conductor 7 and prism 9 to polarizer 11, 12 which polarizes the radiation circularly to the right. The irradiation of the circularly polarized light into the atomic vapor contained in cell 14 results in a varied population of the Zeeman levels of atomic conditions which is apparent from a variation of the extent of excitation of the vapor. High frequency coupling coil 15 supplies electromagnetic radiation in the high frequency range to cell 14 located in the magnetic field. The frequency of high frequency generator 25 is varied and the extent of excitations here in the form of transmissivity measured as a function of the supplied high frequency by means of photo element 17 and amplifier 23. At a frequency dependent upon the magnitude of the magnetic field (in the case of Rb approx. 0.7 MHz/Gauss) resonance occurs which in the simplest case is indicated by a deflection on instrument 24. From the resonance frequency thus measured the magnitude of the magnetic field can be determined by employing known formulae.

The operation of the device according to this invention is simple and does not require any special training. For the conversion of frequency into magnetic field units tables can be used.

Having thus fully described our invention, what we claim as new and wish to secure by Letters Patent is:

1. A magnetometer based on the principle of optical pumping comprising a cell filled with atomic vapor, a light source, means for transmitting the light emitted by the light source to said cell, means for exciting the vapor contained in the cell through a high frequency signal including a coil surrounding the cell and an r.f. generator connected to said coil, means for measuring the extent of excitation of said cell including a photocell responsive to the light penetrating said cell and an indicating device connected to said photocell, characterized in that said cell, said coil and said photocell are disposed in a housing of small volume to form a probe, whereas said r.f. generator, said indicating device and said light source are disposed in a device remote from said probe, said coil and said photocell being connected to said r.f. generator and said indicating device, respectively, by plural lines, said means for transmitting the light emitted by said light source to said cell being provided in the form of a flexible light conductor extending from said light source to said cell, wherein said probe further comprises a prism arranged between the end of the light conductor and the cell for deflecting the beam emanating from the light conductor onto the cell, a polarizer and a quarter wave plate disposed in the path of the rays between the prism and the cell, and a heater surrounding said cell.

2. A Magnetometer according to claim 1 characterized in that the volume of said probe is less than 1 cm$^3$.

3. A Magnetometer according to claim 2 characterized in that the volume of said probe is less than 0.1 cm$^3$.

4. A Magnetometer according to claim 1 characterized in that the means for measuring the extent of excitation include a filter and a photo element which are arranged on the side of the cell where the light beam from the light conductor leaves the cell after having passed through it.

5. A device for the control of a magnetic field by means of a magnetometer according to claim 1, characterized in that the probe of the magnetometer is located in the magnetic field and that the probe is connected to electronic control means which derives a control signal for the magnetic field from the resonance signal supplied by the means for measuring the light transmission.

* * * * *